July 6, 1948.   G. L. KUHL   2,444,876
HITCH OR CLEVIS
Filed April 30, 1947
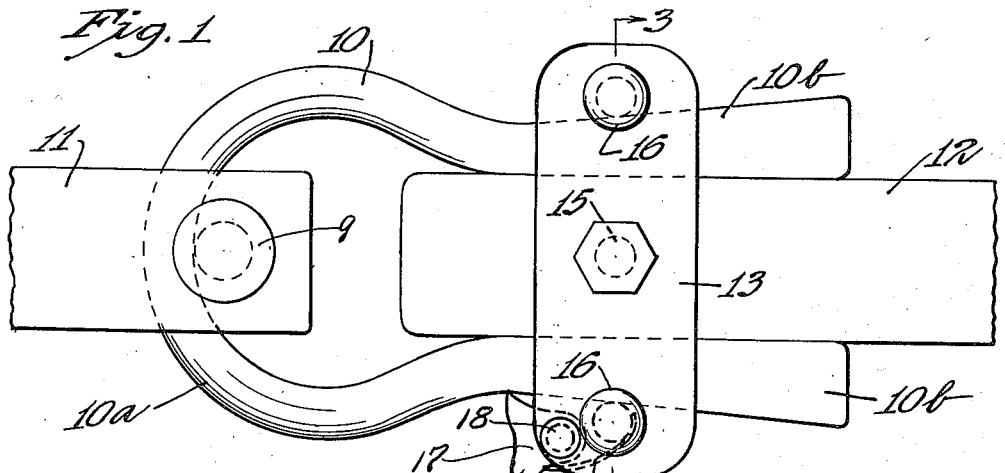
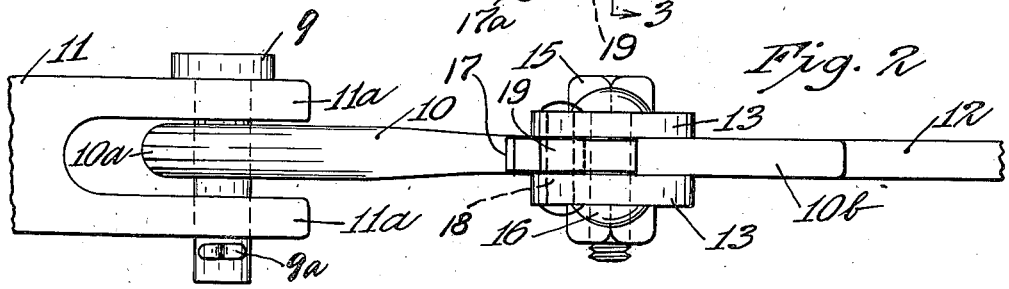
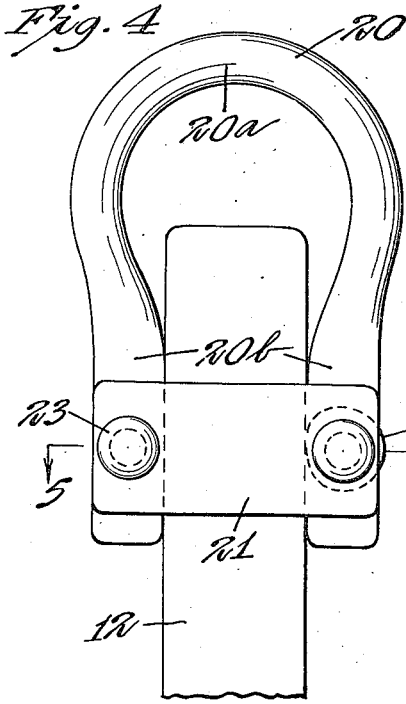
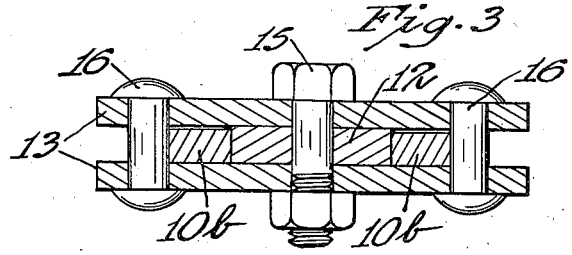
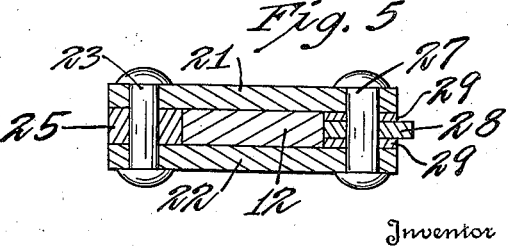
Inventor
Gerald L. Kuhl
By Chas. C. Reif
Attorney Patented July 6, 1948

2,444,876

UNITED STATES PATENT OFFICE 2,444,876

HITCH OR CLEVIS

Gerald L. Kuhl, Chester, Minn.

Application April 30, 1947, Serial No. 745,069

10 Claims. (Cl. 280—33.44)

This invention relates to a clevis or hitch adapted to be used for connecting the draw-bar of a tractor to a vehicle or object to be drawn.

It is the common practice to connect the draw-bar of a tractor to a vehicle by a member or means permitting considerable movement between the draw-bar and said member. The repeated pulling and backing movements of the draw-bar results in the sides of the bar being upset so that the draw-bar becomes deformed and renders it difficult to connect and disconnect it.

It is an object of this invention to provide a hitch or clevis for connecting the draw-bar to the vehicle or object to be drawn comprising means for causing very tight engagement between said hitch or clevis and the draw-bar, which means is actuated by the draw-bar when pulled upon.

It is a further object of the invention to provide a member such as a hitch or clevis having a portion at one end constructed and arranged to be connected to the vehicle to be drawn and having spaced arms at its other end, a draw-bar of a tractor disposed between said arms, and means engaged by said draw-bar and actuated thereby when said bar is pulled upon for moving said arms into tight engagement with said draw-bar.

It is another object of the invention to provide a hitch or clevis having a loop at one end adapted to be connected to the vehicle to be drawn and having spaced arms at its other end, a draw-bar of a tractor disposed between said arms and having its sides substantially parallel to the inner sides of said arms, a plate extending across said arms and draw-bar, means connecting said plate and draw-bar, and means carried by said plate for causing said arms to move together and grip said draw-bar when the latter is pulled upon, preferably with means for backing.

It is more specifically an object of the invention to provide a hitch or clevis comprising a member formed as a loop at one end and having spaced arms at its other end, a draw-bar disposed between said arms and having its sides substantially parallel to the inner sides of said arms, said arms preferably diverging at their outer sides so as to form wedges, plates extending across said arms and draw-bar above and below the same respectively, means connecting said plates to said draw-bar, and means carried by said plates for engaging said outer sides to wedge said arms tightly against said draw-bar when the latter is pulled upon.

These and other objects and advantages of the invention will be fully set forth in the following description made in connection with the accompanying drawings in which like reference characters refer to similar parts throughout the several views and in which:

Fig. 1 is a plan view of the device;

Fig. 2 is a view in side elevation of the device;

Fig. 3 is a vertical section taken on line 3—3 of Fig. 1, as indicated by the arrows;

Fig. 4 is a plan view of a modified form of device; and

Fig. 5 is a vertical section taken on line 5—5 of Fig. 4, as indicated by the arrows.

Referring to the drawings, a member 10 is shown having a portion at one end adapted to be connected to a vehicle to be drawn, and while this portion could be variously formed, in the embodiment of the invention illustrated it is shown as a loop 10a of circular form in plan throughout most of its extent. A member or clevis 11 adapted to be connected to a vehicle or other object to be drawn has vertically spaced portions 11a at one end disposed respectively above and below portion 10a and apertured to receive a headed pin 9 passing through loop 10a. A suitable means such as a cotter pin 9a holds pin 9 in place. Member 11 is thus connected to member 10. Member 10 has spaced arms 10b at its other end, and while these might be variously formed, in the embodiment of the invention illustrated they are shown as flattened from the cylindrical portion forming loop 10a so that their outer sides diverge. The inner sides of arms 10b are substantially parallel and said arms are thus in the form of wedges. A draw-bar 12 of a tractor is shown having its end disposed between arms 10b, said bar 12 being of flat rectangular shape in vertical cross section and disposed in substantially the same plane as the arms 10b. The inner sides of arms 10b are substantially parallel to the sides of the bar 12. Plates 13 and 14 are provided which extend across bar 12 and arms 10b above and below the same respectively. Plates 13 and 14 are of considerable width. Plates 13 and 14 are connected to draw-bar 12 by the headed and nutted bolt 15 shown as extending centrally of plates 13 and 14 and draw-bar 12. The plates 13 and 14 extend beyond arms 10b and have pins 16 extending through and between the same, said pins having their ends riveted at the outer sides of said plates. The inner sides of pins 16 are closely adjacent the outer sides of arms 10b. A pawl 17 is preferably pivoted between plates 13 on a pin 18. Pin 18 has its ends riveted on the remote sides of plates 13. Pawl 17 has its engaging end urged against one of the sides 10b by a plate spring 19. Pawl 17 has a releasing lug 17a at one side thereof.

In operation when draw-bar 12 is pulled upon toward the outer end of arms 10b, it will also move the plates 13 and 14 toward the outer ends of said arms. This will cause the pins 16 to move along the outer sides of arms 10b and since these arms diverge this will cause said arms to be moved together and to be wedged very tightly against the sides of draw-bar 12. The more force that is exerted by draw-bar 12 in its pulling movement, the greater will be the force moving arms 10b together and the tighter will be the engagement between said arms and the sides of draw-bar 12. This results in a very rigid connection between draw-bar 12 and member 10. There can be no relative longitudinal movement of arms 10b and draw-bar 12 and movement in a vertical plane is prevented by the plates 13 and 14. The result is that a rigid relationship is maintained between members 10 and 12 and draw-bar 12 is not banged against member 10, a connecting bolt or any other object to upset and distort. It is often desired to back the tractor with a heavy load. The force necessary for this might release draw-bar 12 and permit rearward movement of plates 13. To prevent this pawl 17 is provided. Said pawl will bite into the side of 10b engaged thereby and prevent rearward movement of plates 13 on member 10. This will prevent releasing of draw-bar 12. Pawl 17 can be released by striking lug 17a with a hammer or similar implement.

It is obvious that other means could be used within the scope of this invention to move the arms 10b. In Figs. 4 and 5 another form of the device is shown in which a member 20 is provided having an end portion 20a similar to portion 10a of member 10. Member 20 has spaced arms 20b at its other end having inner sides which are substantially parallel and between which is disposed the draw-bar 12. Plates 21 and 22 extend across arms 20b and bar 12 above and below the same respectively. A pin 23 extends between plates 21 and 22 adjacent one end thereof and through one of the arms 20b. A filler sleeve or washer 25 may surround pin 23 between plates 21 and 22. Another pin 27 extends between plates 21 and 22 adjacent the other ends thereof, both pins 23 and 27 having their ends riveted over the outer sides of plates 21 and 22. An eccentric washer or cam 28 is journaled on pin 27 between plates 21 and 22 and comparatively thin washers 29 of fiber or similar material may be disposed at either side of member 28 and about pin 27. Member 28 is in the form of an eccentric having its radius increasing from the side thereof adjacent draw-bar 12 toward the free end of said draw-bar or toward loop 20a.

In operation when draw-bar 12 is pulled upon it will cause rotation of member 28 in a counter-clockwise direction, as seen in Fig. 4. This will move the larger radius portion of member 28 toward bar 12 and this will act to wedge bar 12 between member 28 and the side of the other arm 20b. The greater the force in the pulling movement of bar 12, the greater will be the force causing engagement of said bar with member 28 and member 20. The result will be that a rigid relationship will be maintained between draw-bar 12 and member 20 so that no loose movement of bar 12 is possible to cause upsetting or distortion thereof by contact with another member.

From the above description it will be seen that I have provided a simple, novel and ingenious clevis or hitch for connecting a tractor to a vehicle or other object to be drawn. The device acts to maintain a rigid connection and relationship with the draw-bar and the draw-bar is thus protected and maintained in the proper form. The device is simple in construction, it can be easily and quite inexpensively made and can be made very rugged for its intended use. The device comprises few parts and can be sold at a price commensurate with other hitches. The device has been amply demonstrated in actual practice, found to be very successful and efficient and is being commercially made.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A hitch or clevis having in combination, a member having a portion at one end adapted to be connected to a vehicle to be drawn, said member having spaced arms at its other end, a draw-bar of a tractor disposed between said arms, and means for moving said arms into tight engagement with said draw-bar when said bar is pulled upon.

2. A hitch or clevis having in combination, a member having a loop at one end adapted to be connected to a vehicle to be drawn, said member having spaced arms at its other end, a draw-bar of a tractor disposed between said arms, and means engaged by said draw-bar and actuated thereby when the same is pulled upon for moving said arms into tight engagement with said draw-bar.

3. A hitch or clevis having in combination, a member having a portion at one end adapted to be connected to a vehicle to be drawn, said member having spaced arms at its other end, a draw-bar of a tractor disposed between said arms, a plate extending across and between said arms, and means carried by said plate and actuated by said draw-bar when pulled upon for moving said arms into tight engagement with said draw-bar.

4. A hitch or clevis having in combination, a member having a portion at one end adapted to be connected to a vehicle to be drawn, said member having spaced arms at its other end, a draw-bar of a tractor disposed between said arms, a plate extending across and between said arms, means connecting said plate to said draw-bar and means carried by said plate for moving said arms into tight engagement with said draw-bar when the latter is pulled upon.

5. A hitch or clevis having in combination, a member having a portion at one end adapted to be connected to a vehicle to be drawn, said member having spaced arms at its other end, a draw-bar disposed between said arms and having sides substantially parallel to the inner sides of said arms, said arms having diverging outer sides to thus form wedges, a plate extending across and between said arms and across said draw-bar, means connecting said plate to said draw-bar, and means carried by said plate engaging said outer sides to move said arms toward each other to grip said draw-bar when the latter is pulled upon.

6. A hitch or clevis having in combination, a member having a portion in one end adapted to be connected to a vehicle to be drawn and having spaced arms at its other end, a draw-bar of a tractor disposed between said arms and in substantially the same plane as said arms, plates extending across said arms and draw-bar above and below the same, means connecting said plates to said draw-bar, and means carried by said plates between the same and engaging the outer sides of said arms for moving said arms together and pressing the same against said draw-bar when the latter is pulled upon.

7. The structure set forth in claim 6, said last mentioned means comprising pins extending between said plates, the outer sides of said arms diverging and engaged by said pins.

8. The structure set forth in claim 3 and means for preventing movement of said plate toward said one end of said member when said draw bar is moved in an opposite direction.

9. The structure set forth in claim 6 and means preventing movement of said plates toward said one end of said member when said draw bar is moved in the opposite direction.

10. The structure set forth in claim 1 and means for maintaining said tight engagement when said draw bar is moved in the opposite direction.

GERALD L. KUHL.